3,426,275
MEANS FOR MEASURING CURRENT FLOW IN A CONDUCTOR BY REDUCTION IN MAGNETIZATION OF A LOW COERCIVITY MAGNETIC MEMBER
Edmund O. Schweitzer, Jr., 1002 Dundee Road, Northbrook, Ill. 60062
Continuation-in-part of applications Ser. No. 124,858, July 18, 1961, Ser. No. 243,113, Dec. 7, 1962, Ser. No. 301,412, Aug. 12, 1963, Ser. No. 302,295, Aug. 15, 1963, and Ser. No. 329,820, Dec. 11, 1963. This application Sept. 28, 1965, Ser. No. 491,000
U.S. Cl. 324—127  24 Claims
Int. Cl. G01r 7/02

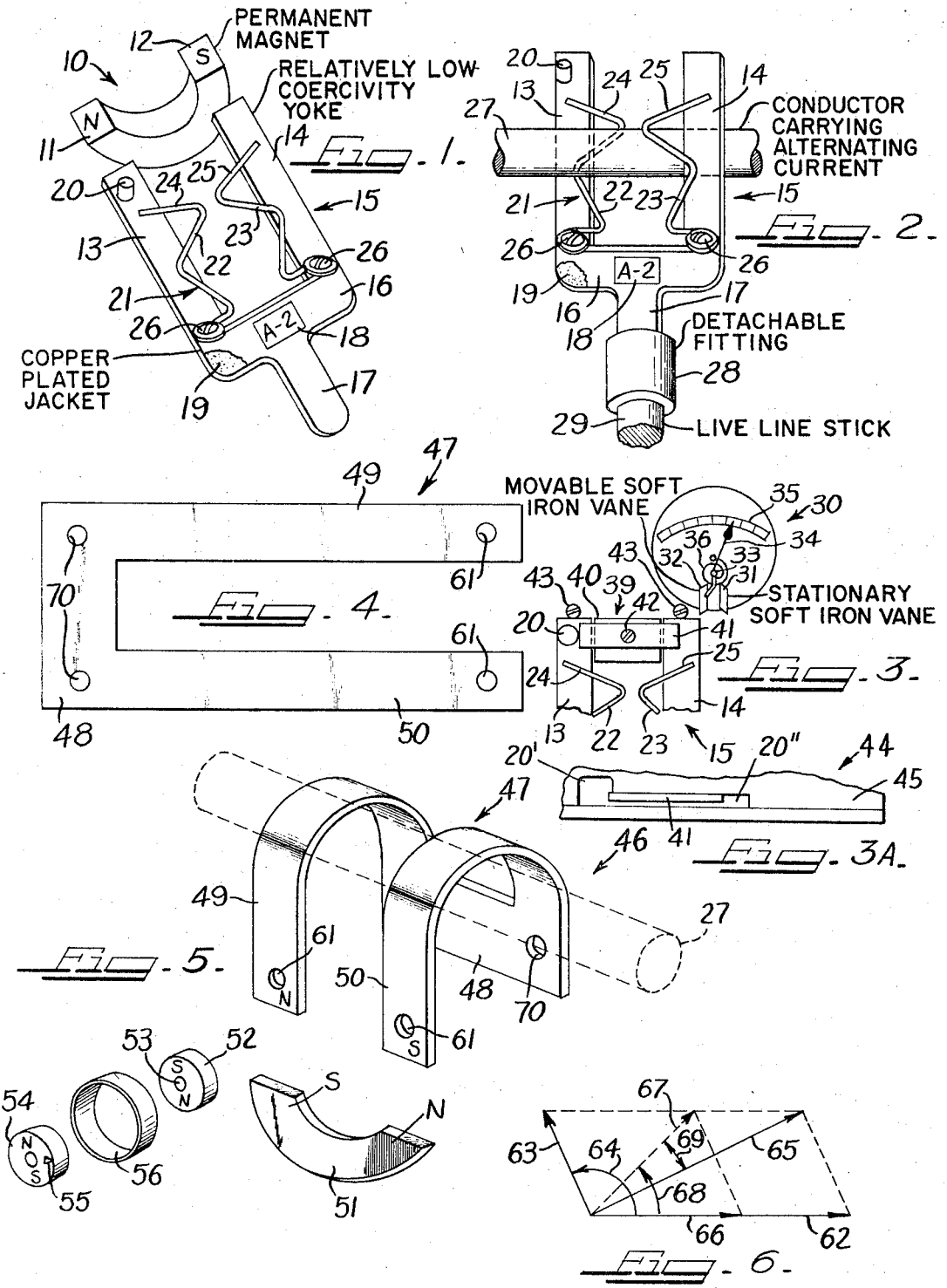

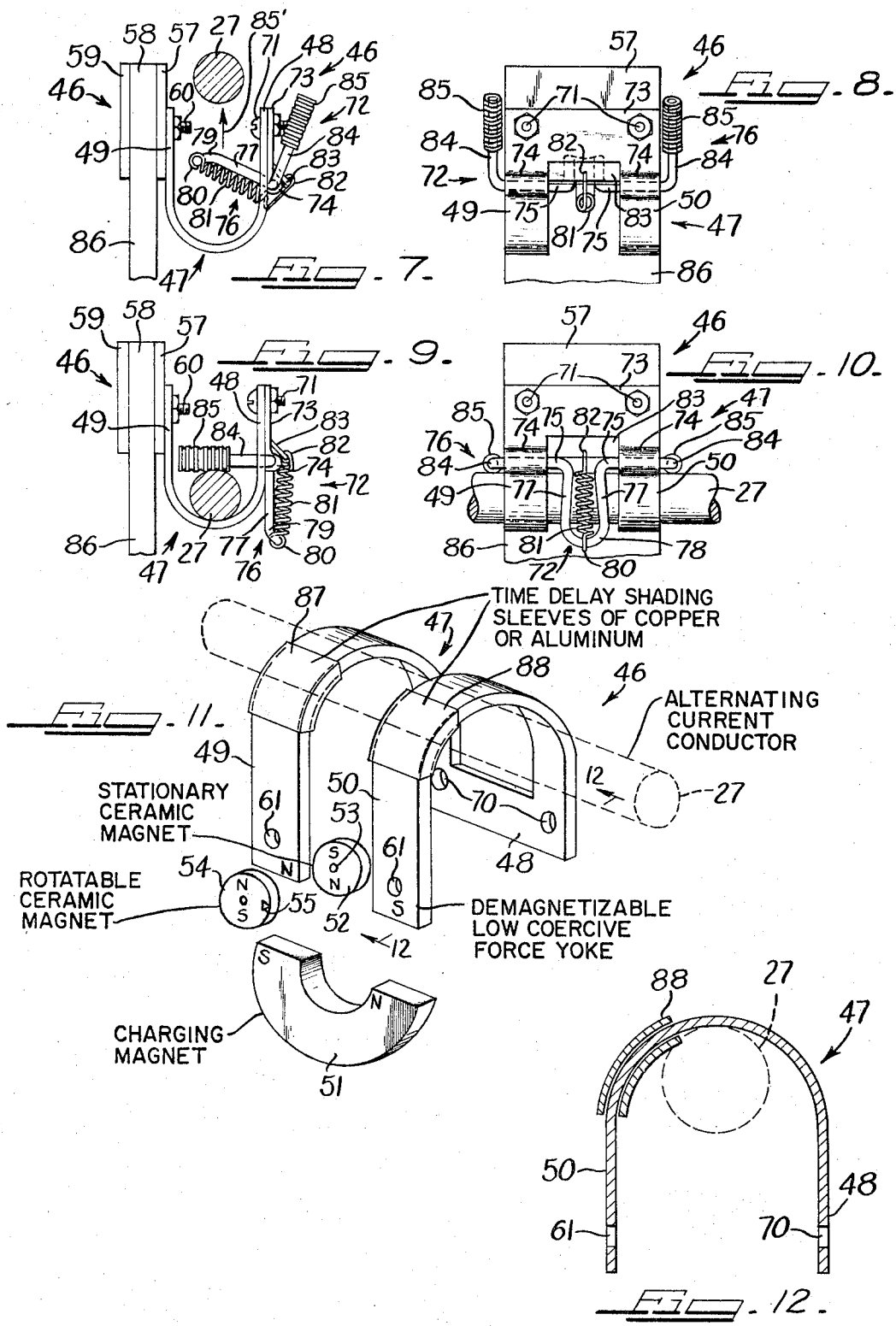

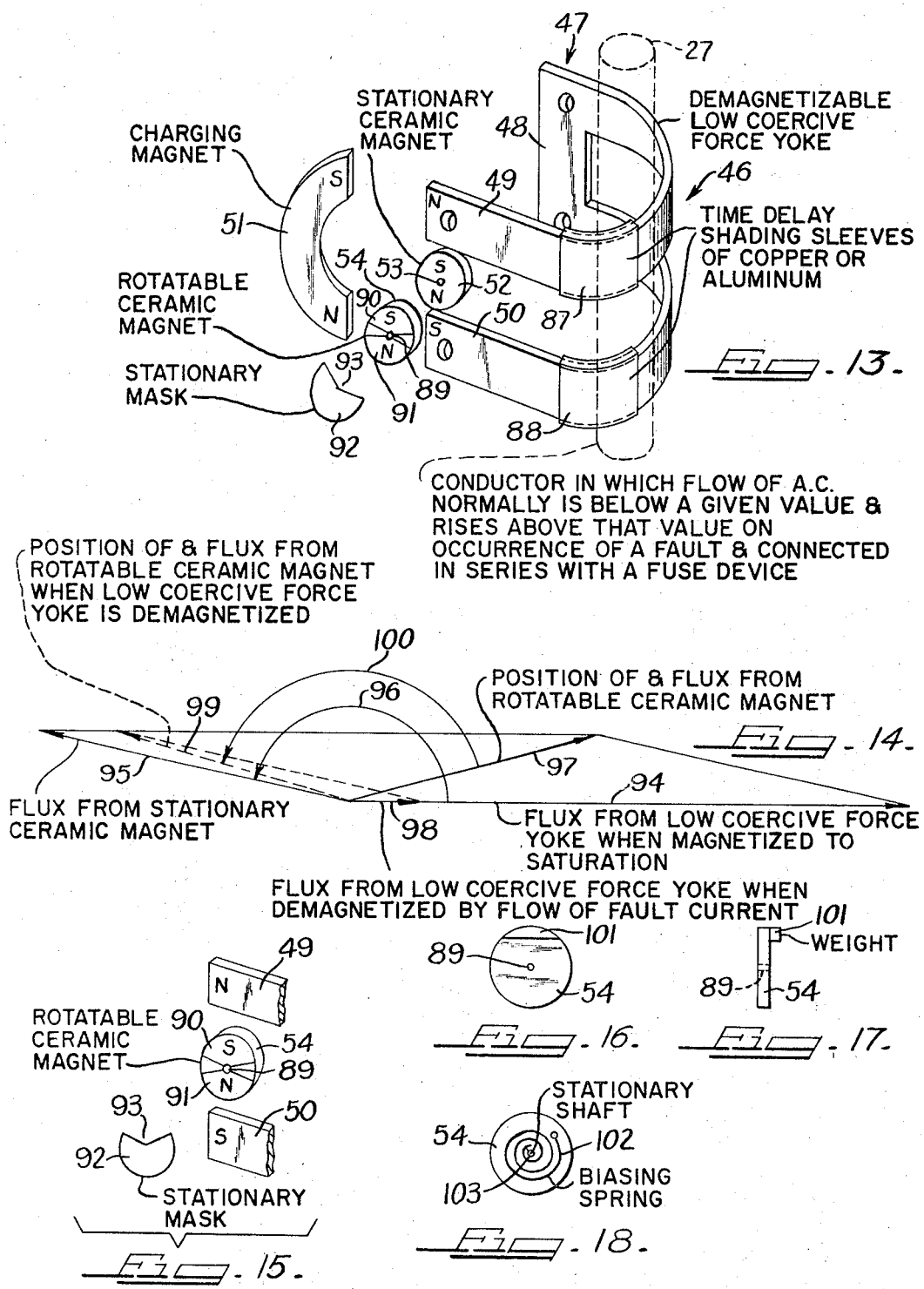

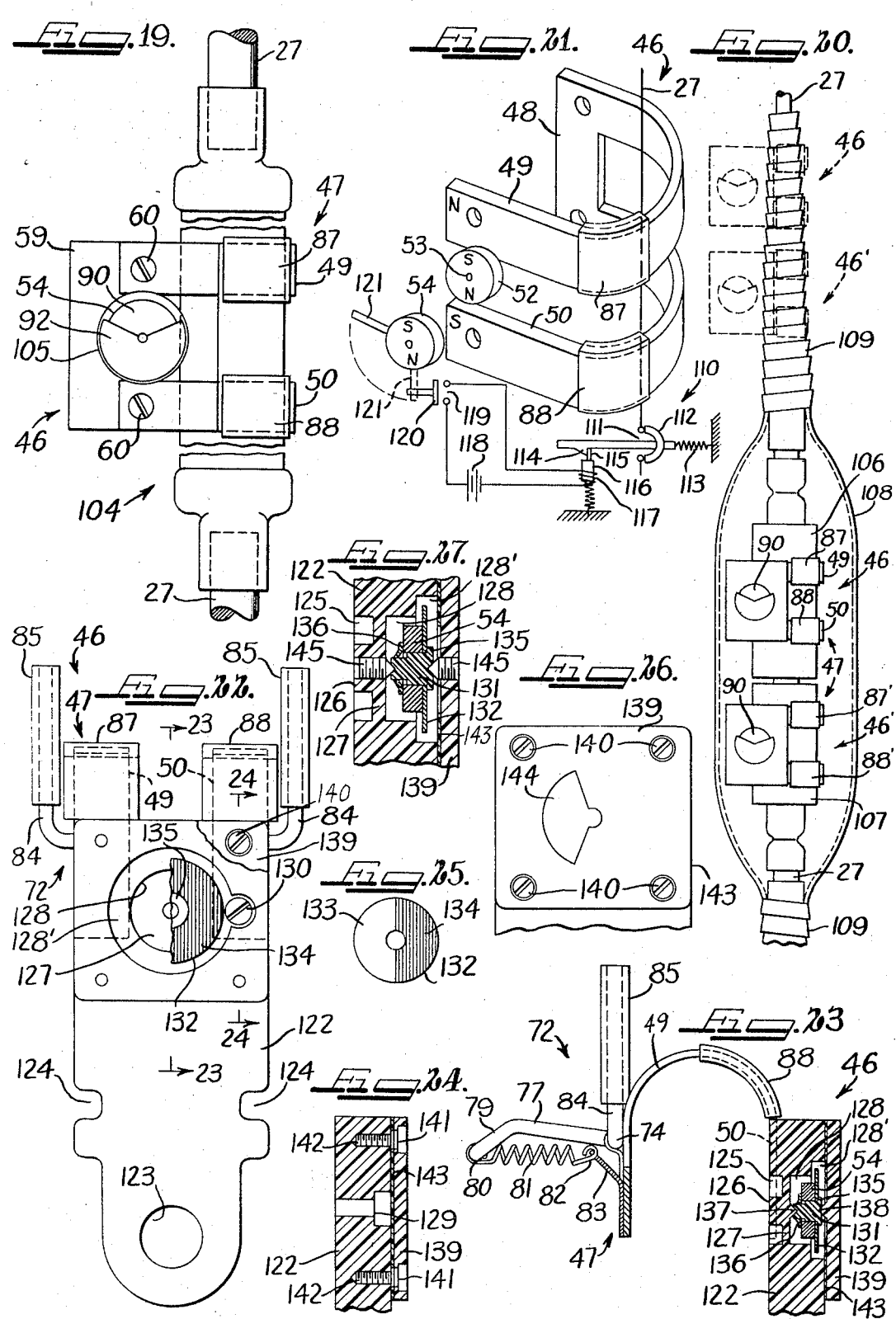

ABSTRACT OF THE DISCLOSURE

For measuring maximum flow of current in a conductor a U-shaped magnetic member having low coercivity is magnetized to have opposite poles at the ends of the arms which are positioned adjacent the conductor in the magnetic field generated by the maximum current flow to reduce the unidirectional magnetic flux from the poles at the ends of the arms as a function of the magnitude of the current flow and an indicator is responsive to the reduced unidirectional flux.

---

This application is a continuation-in-part of application Ser. No. 124,858, filed July 18, 1961, now abandoned; of application Ser. No. 243,113, filed Dec. 7, 1962, now abandoned; of application Ser. No. 301,412, filed Aug. 12, 1963, now abandoned; of application Ser. No. 302,295, filed Aug. 15, 1963, now abandoned; and of application Ser. No. 329,820, filed Dec. 11, 1963, now abandoned. This invention relates, generally, to electric current measuring means and it has particular relation to the measurement of flow of alternating or direct current in a conductor, such as an overhead or underground electric power transmission conductor or the like.

Among the objects of this invention are: To provide simple and efficient means for measuring the flow of alternating or direct current in a conductor; to provide improved means for measuring the maximum flow of alternating current in a conductor; to make the measurement in the half cycle in which the maximum current flow takes place; to employ for these purposes a yoke of relatively low coercivity magnetic material that can be readily magnetized and demagnetized; to provide for magnetizing the yoke to a predetermined extent with a unidirectional magnetic field; to position the yoke thus magnetized in the magnetic field generated by the flow of the alternating current in a conductor where the yoke is demagnetized to an extent proportional to the intensity of the alternating magnetic field; to measure the extent that the yoke has been demagnetized, thereby measuring the amount of alternating current flow in the conductor required to effect such demagnetization; to provide for releasably mounting the yoke in operative position relative to the conductor; to construct the yoke with both arms embracing the conductor in the same direction; to provide on the yoke an indication of the current flow; to combine with the flux from the yoke, which is a function of maximum current flow, a flux from a permanent magnet which is substantially unvarying; to position a movable permanent magnet in accordance with the resultant of these two fluxes; to provide for limiting the reduction in the unidirectional magnetic flux in a generally U-shaped magnetic member that has been magnetized when it is associated with a conductor in which 60-cycle per second alternating current or direct current normally flows and is subjected to flow of transient current in the conductor caused by a lightning stroke, switching surge or the like; to accomplish such limitation by absorbing the major portion of the energy incident to such transient current flow that otherwise would be expended in demagnetizing the magnetic member; to apply a sleeve of good conducting metal to one of the arms of the U-shaped magnetic member for absorbing the energy of the transient current as aforesaid; to provide each arm with a sleeve of good conducting metal, such as copper or aluminum; to position the sleeves adjacent the distal ends of the arms of the U-shaped magnetic member; to provide for operating a movable permanent magnet from one position to another position on increase in flow of current in a circuit above a predetermined magnitude in a new and improved manner; to cause the permanent magnet to shift with a snap action when the flow of current exceeds the predetermined magnitude; to employ the shift in position of the permanent magnet to indicate that a fuse has blown; to employ the shift in position of the permanent magnet to trip a circuit breaker; to position a stationary permanent magnet with its poles adjacent unlike poles of a magnetic member having relatively low coercivity and magnetized with unidirectional magnetic flux; to position a rotatable permanent magnet where it is responsive to the resultant of the magnetic fields of the stationary permanent magnet and the magnetized magnetic member and to provide for demagnetizing the magnetic member by subjecting it to the magnetic field generated by flow of current in a conductor; to cause the flow of current incident to the blowing of a fuse to demagnetize the magnetic member whereby the shift in position of the rotatable permanent magnet shows that the fuse has blown; to employ the shift in position of the rotatable permanent magnet to trip a circuit breaker in response to flow of predetermined current in a circuit controlled by the circuit breaker; to employ the magnetic field generated by flow of current sufficient to blow a current limiting fuse for indicating that this fuse has blown; to employ the magnetic field generated by flow of current sufficient to blow an overcurrent type of fuse for indicating that this fuse has blown; to associate with a series connected conventional fuse of the overcurrent type and a current limiting fuse two indicating devices of the kind and character above referred to with one indicating device being arranged and adapted to indicate that the conventional fuse has blown and the other to indicate that the current limiting fuse has blown; to arrange for one of the two indicating devices to operate only on relatively low current flow in the fuses and to be substantially unaffected by current flow required to blow the current limiting fuse and for the other of the two indicating devices to operate only on flow of current sufficient to blow the current limiting fuse; and to bias the rotatable permanent magnet from the non-indicating position to the indicating position either by gravity or by a spring without requiring the presence of the stationary permanent magnet. Other objects of this invention will, in part, be obvious and in part appear hereinafter.

In the drawings:

FIG. 1 is a perspective view of the permanent charging magnet and the relatively low coercivity yoke that is magnetized thereby.

FIG. 2 is a perspective view showing the application of the magnetized yoke to a conductor carrying alternating current.

FIG. 3 shows somewhat diagrammatically the manner in which the degree of demagnetization of the yoke is measured by a meter of the iron vane indicating type.

FIG. 3A shows a portion of a case having a keyway for receiving the yoke.

FIG. 4 is a plan view of a low coercivity magnetic yoke that is a modification of the magnetic yoke shown in FIG. 1 and is employed in the maxmeters and fault indicators shown in certain of the succeeding figures.

FIG. 5 is a perspective view, somewhat diagrammatic in character, showing details of construction of the maxmeter.

FIG. 6 is a vector diagram showing how the maxmeter functions.

FIG. 7 is a view, in side elevation, of a maxmeter provided with a self energizing clamp and illustrating how the maxmeter is applied to a conductor the current flow through which is to be measured, only a portion of the support bracket being shown.

FIG. 8 is a view, in rear elevation, of the maxmeter shown in FIG. 7, the conductor being omitted.

FIG. 9 is a view, similar to FIG. 7, showing the maxmeter clamped in position on the conductor.

FIG. 10 is a view, in rear elevation, of the construction shown in FIG. 9.

FIG. 11 is a perspective view of a maxmeter embodying the present invention showing its application to an alternating current conductor, certain parts being shown in disassembled relation together with the charging magnet, the arms of the yoke being provided with time delay shading sleeves.

FIG. 12 is a vertical sectional view taken generally along the line 12—12 of FIG. 11.

FIG. 13 is a perspective view of a maxmeter of the fault indicating type constructed in accordance with this invention and shown with certain parts in disassembled relation.

FIG. 14 is a vector diagram that demonstrates certain operating conditions for the maxmeter of the fault indicating type as shown in FIG. 13.

FIG. 15 is a perspective view of a portion of a maxmeter of the fault indicating type constructed with certain of the elements shown in FIG. 13 and employing a weight instead of a stationary permanent magnet for biasing the rotatable permanent magnet.

FIG. 16 is a view, in rear elevation, of the rotatable permanent magnet provided with a weight for biasing it.

FIG. 17 is a view, in side elevation, of the rotatable permanent magnet shown in FIG. 16.

FIG. 18 is a view, similar to FIG. 16, but showing a biasing spring instead of a weight for biasing the rotatable permanent magnet.

FIG. 19 shows how the maxmeter can be applied to a current limiting fuse for indicating that it has blown.

FIG. 20 shows how two maxmeters can be applied to a conductor in which a conventional overcurrent fuse and a current limiting fuse are connected in series with the maxmeters being arranged and constructed for the purpose of showing whether one or the other or both of the fuses have operated.

FIG. 21 is a perspective view, somewhat diagrammatic in character, showing how the maxmeter of the present invention can be employed for tripping a circuit breaker on flow of predetermined current in a conductor in which the circuit breaker is connected for opening the circuit.

FIG. 22 is a view, in front elevation, certain parts being broken away, showing another modification of the maxmeter arranged to provide an indication of a fault.

FIG. 23 is a vertical sectional view taken generally along the line 23—23 of FIG. 22.

FIG. 24 is a vertical sectional view taken generally along the line 24—24 of FIG. 23.

FIG. 25 is a plan view of the index disc that is employed in connection with the maxmeter shown in FIG. 22.

FIG. 26 is a plan view of the cover for the maxmeter shown in FIG. 22 having mounted on its underside a mask provided with a window through which the index shown in FIG. 25 can be viewed.

FIG. 27 is a vertical sectional view showing an alternate pivot mounting arrangement for the index disc and permanent magnet rotatable therewith that can be employed in the maxmeter construction shown in FIG. 22 and certain of the preceding figures.

Referring now particularly to FIG. 1 of the drawings, it will be observed that the reference character 10 designates, generally, a C-shaped permanent charging magnet having a high coercive force and provided with a north pole 11 and a south pole 12. The permanent charging magnet 10 can be a conventional horse-shoe type of magnet and its poles 11 and 12 are arranged to be engaged by arms 13 and 14, respectively, of a generally U-shaped yoke that is indicated, generally, at 15 and has a base portion 16 from which a tongue 17 extends. It will be observed that the arms 13 and 14 are spaced apart to substantially the same distance that the north and south poles 11 and 12 are spaced apart, the arrangement being such that, when the arms 13 and 14 are placed in overlying relation to the north and south poles 11 and 12, preferably in contact engagement therewith, and they are drawn over the same, the yoke 15 is magnetized to an extent that is determined by its magnet characteristics and by the strength of the permanent charging magnet 10.

Since it is likely that a number of the yokes 15 will be used, an indicia bearing portion 18 is provided centrally of the base portion 16 and it carries a suitable number, i.e., A–2, to identify the particular yoke 15. It will be understood that other numbers and other numbering systems can be employed as may be desired. Also, the indicia bearing portion 18 may be merely a roughened surface on which a suitable marking can be applied as may be desired.

Since it is desirable to exclude the effect of transient current flow which may result from switching surges, lightning strokes and the like, the arms 13 and 14 and the base portion 16 of the yoke 15 are overlaid with a conducting jacket 19. For example, the jacket 19 can be formed by plating a layer of copper or like material to inhibit the demagnetization of the yoke 15 as the result of transient current flow.

In order to properly orient the yoke 15 with respect to the permanent charging magnet 10 and with respect to the measuring means described hereinafter, a boss 20 is mounted on the arm 13 and it cooperates with a notch 20' FIG. 3A, forming a part of a keyway 20" to insure that the yoke 15 is located in predetermined relation with respect to the permanent charging magnet 10 and with respect to the measuring means.

Since it is desired that provision be made for detachably mounting the yoke 15 on a conductor in which the maximum current flow is to be measured, a resilient clip, shown generally at 21, is provided. The resilient clip 21 is formed of spring wire and includes arms 22 and 23 having inclined end portions 24 and 25 to guide the clip 21 into holding position with respect to the conductor. Screws 26—26 serve to hold the resilient clip 21 in position on the yoke 15.

FIG. 2 shows how the yoke 15, after it has been magnetized by contact with the permanent charging magnet 10, can be applied to a conductor 27. It will be observed that the tongue 17 is mounted on a detachable fitting 28 that is carried by a live line stick 29 of suitable insulating material. It will be understood that the yoke 15 mounted on the live line stick 29 is moved to the position shown in FIG. 2 and in so doing that the inclined portions 24 and 25 are spread apart on engagement with the conductor 27 while continued force applied to the yoke 15 by the live line stick 29 causes the yoke 15 to be moved to the position shown. Here the inclined portions 24 and 25 have moved beyond the conductor 27 and the resilient clip 21 then collapses to hold the yoke 15 in position to be demagnetized by the alternating magnetic field generated by the flow of alternating current in the conductor 27. By suitable operation of the detachable fitting 28, the yoke 15 can be left in position on the conductor 27.

It will be understood that the yoke 15 is left in the position on the conductor 27 for a period such as for twenty-four hours or any other period during which it is desired to obtain a measure of the maximum current flow in the conductor 27. The demagnetization of the yoke 15 is effected by the alternating magnetic field generated by flow of alternating current through the conductor 27. Since this alternating field is in phase with the current flow, the demagnetizing effect of maximum current flow in any half cycle occurs in that half cycle and thus may be said to be instantaneous and undamped since no mechanical inertia, friction or the like is required to be overcome as in the case of a movable indicator.

In order to remove the yoke 15, the live line stick 29 is elevated to place the detachable fitting 28 in operative position with respect to the tongue 17 and then it is gripped in conventional manner. Thereafter, an endwise pull on the live line stick 29 is sufficient to withdrawn the yoke 15 from the conductor 27 by spreading apart the arms 22 and 23 of the resilient clip 21. The yoke 15 is removed from the detachable fitting 28, care being taken not to affect the magnetization of the yoke 15.

In order to measure the extent of demagnetization of the yoke 15, it is brought into proximity to a unidirectional magnetic field measuring meter that is indicated generally at 30 and is of the iron vane indicating type. As shown diagrammatically in FIG. 3 the meter 30 includes a conventional stationary soft iron vane 31 and in cooperative relation thereto is a movable soft iron core vane 32 which is pivoted at 33 and carries a pointer 34 that is arranged to move relative to a scale 35 that may be suitably calibrated. A biasing spring 36 is arranged to hold the pointer 34 in an initial position in the absence of the magnetic field to be measured.

It is essential for accuracy that the arms 13 and 14 of the yoke 15 be positioned in a predetermined location with respect to the stationary and movable vanes 31 and 32. Accordingly, as shown in FIG. 3, a positioning fixture, shown generally at 39, is provided. It includes a centering block 40 and an overlying plate 41 that is held in position by a screw 42. The plate 41 is aligned with the keyway 20″, FIG. 3A, which is located in a case, a portion of which is shown generally at 44. The keyway 20″ is located in a side wall 45 of the case 44. Stop screws 43—43 limit the extent that the arms 13 and 14 of the yoke 15 can be moved past the centering block 40 and thus always position the arms 13 and 14 in the same location relative to the vanes 31 and 32.

Since maximum magnetization of the yoke 15 after application to the conductor 27 corresponds to minimum current flow therethrough, when a conventional iron vane type of meter 30 is employed it is necessary to have the scale descend from left to right rather than ascend from left to right. By reversing the positions of the stationary and movable soft iron vanes 31 and 32, the arrangement can be such that the minimum current indication will appear at the left of the scale 35.

Referring now particularly to FIGS. 5 and 7 to 12 of the drawings, it will be observed that the reference character 46 designates, generally, a maxmeter which, while making use of the principle of the invention using the low coercivity yoke 15 described hereinbefore, provides for indicating thereon the change in its magnetic flux resulting from it being subjected to the alternating flux surrounding the conductor 27 as the result of flow of alternating or direct current therethrough. The maxmeter 46 employs a yoke 47 of low coercivity magnet steel which corresponds, in function, to the U-shaped yoke 15 previously described. However, the yoke 47 has certain advantages that will be outlined presently. Initially, as shown in FIG. 4, the yoke 47 is of flat U-shape. It includes a base portion 48 and extending therefrom are arms 49 and 50 each of which is bent into a U-shape for the purpose of embracing the conductor 27 on the same side rather than on opposite sides as is the case for the U-shaped yoke 15. An important reason for employing the configuration shown for the yoke 47 is to cause one of the arm 49, for example, to be demagnetized to an extent depending upon the flow of current in one half cycle of the alternating current and then to have the other arm, i.e., the arm 50, demagnetized on the succeeding half cycle of the alternating current. There is then no likelihood that a direct current surge of great magnitude, for example a surge resulting from a lightning stroke, would magnetize the yoke 47 which might be the case when the configuration of the yoke 15 is employed. Such magnetization as a result of the flow of relatively high direct current would cause the device to give an erroneous reading with respect to the maximum flow of alternating current through the conductor 27. Depending upon the direction of such direct current flow, one or the other of the arms 49 and 50 will be demagnetized to an extent depending upon the magnitude of the flow of direct current. Because of such demagnetization, there may be an error in the indication caused by maximum flow of alternating current through the conductor 27 which can be avoided in the manner described hereinafter.

FIG. 5 shows diagramatically the arrangement of the yoke 47 with respect to the conductor 27 having associated therewith a C-shaped permanent magnet 51 that is employed for initially charging the arms 49 and 50 to the polarities indicated. It will be understood that, after the arms 49 and 50 of the yoke 47 have been charged by the permanent magnet 51, it is removed from their vicinity and subsequently the yoke 47 is positioned in operative location with respect to the conductor 27 where the arms 49 and 50 are demagnetized by successive half cycles of the alternating current to an extent depending upon the magnitude of the current flow in each half cycle.

It is desirable that indicating means be incorporated with the yoke 47 to the end that it is unnecessary to employ separate and distinct measuring means for determining the extent to which the yoke 47 has been demagnetized. For this purpose a stationary permanent magnet 52 is suitably mounted between the ends of the arms 49 and 50. Since permanent magnets of annular shape are readily available, the stationary permanent magnet 52 is shown in this configuration and it is permanently magnetized to have the polarities as indicated at diametrically opposite locations. However, it will be understood that a bar type of magnet can be employed, if desired. The use of the annular shape facilitates mounting of the permanent magnet 52 since the central opening 53 therethrough readily permits the mounting in a fixed position between the ends of the arms 49 and 50.

Mounted for rotation about the axis of the permanent magnet 52 is a rotatable permanent magnet 54. It is shown of annular shape for the reasons above outlined and it is mounted in suitable bearings to rotate relative to the stationary permanent magnet 52 and the ends of the arms 49 and 50. The rotatable permanent magnet 54 of annular shape is magnetized to have the polarities indicated thereon and it also carries an index 55. If desired, a pointer can be substituted for the index 55 if it is desired to have it cooperate with a scale, such as scale 35, FIG. 3, that is removed a substantial distance from the axis of rotation of the rotatable permanent magnet 54. In order to limit the oscillatory movement of the rotatable permanent magnet 54 a damping ring 56 of suitable conducting material, such as copper, is stationarily mounted in close proximity to the periphery of the annular rotatable permanent magnet 54.

Any suitable means can be provided for stationarily mounting the permanent magnet 52, the damping ring 56, and for rotatably mounting the permanent magnet 55. In the construction shown in FIGS. 7 and 9 it will be understood that the permanent magnet 52 is carried by a rear plate 57 of non-magnetic material such as a plastic material. An intermediate plate 58, also of non-magnetic material, overlies the rear plate 57 and is provided with a suitable opening in which the permanent magnet 55 is rotatably mounted on suitable bearings one of which is carried by a cover plate 59 of non-magnetic material. The damping ring 56 is mounted in the opening in the intermediate plate around the rotatable permanent magnet 54. Screws, one shown at 60, having countersunk heads extend through the several plates 57, 58 and 59 and through holes 61—61, FIGS. 4 and 5, in the ends of the arms 49 and 50 for the purpose of securely mounting the assembly in position thereon.

FIG. 6 shows by suitable vectors how the various magnetic fluxes interact to position the rotatable permanent magnet 54 in accordance with the magnetization of the yoke 47. Here the vector 62 represents the magnitude of the magnetic flux between the ends of the arms 49 and 50 and reacting with the magnetic flux from the stationary permanent magnet 52. Vector 63 represents the permanent magnet flux from the stationary permanent magnet 52 and it is positioned so that the angle indicated at 64 between the direction of the magnetic flux from the stationary permanent magnet 52 to the magnetic flux between the ends of the arms 49 and 50 is greater than 90° and preferably is of the order of 110°. This relationship provides a longer scale than is permitted when the right angular relationship is employed. Vector 65 is the resultant of the vectors 62 and 63. The position taken by the rotatable permanent magnet 64 depends upon the position of the resultant vector 65 and it assumes a position in which its permanent magnet field lies along the vector 65. With the yoke 47 fully charged to saturation this position is considered to be a zero position and the index 55 is correspondingly positioned opposite the zero point of the scale, such as the scale 35, FIG. 3.

Now it will be assumed that alternating current flows through the conductor 27 and that the yoke 47 is positioned to embrace it as shown in FIGS. 5 and 9. There is a corresponding demagnetizing effect on the magnetic flux previously existing in the arms 49 and 50 and it can be assumed that vector 66 represents this reduction or represents the remaining flux which reacts with the unvarying magnetic flux from the stationary permanent magnet 52 as represented by vector 63. The resultant flux indicated by vector 67 corresponds to the magnitude and direction of the magnetic flux which reacts with the magnetic flux from the rotatable permanent magnet 54 and it then assumes a position corresponding to the position of the vector 67 or angle 68. A corresponding movement of the index 55 takes place relative to the scale through the angle indicated at 69. It will be understood that the higher reading or movement of the rotatable permanent magnet 54 through angle 69 corresponds to the magnitude of the maximum alternating current flow that took place through the conductor 27.

Attention is directed to the fact that there is no time delay in the demagnetization of the arms 49 and 50. Accordingly, the flux remaining therein after maximum current flow of the appropriate half cycle accurately reflects the maximum current flow in that half cycle. While there may be some time delay due to the inertia of the rotatable permanent magnet 54 in reaching its new position, it moves the index 55 therewith to indicate on the scale, such a scale 35, FIG. 3, the magnitude of the flow of alternating current in the conductor 27 which was required to demagnetize the arms 49 and 50 to a corresponding extent, such movement taking place as determined by the inertia and friction of the system but accurately reflecting the maximum current flow that took place.

As pointed out above, since the arms 49 and 50 are demagnetized on successive half cycles of flow of maximum alternating current, it follows that, if only one half cycle of current flows, the corresponding arm 49 and 50 is demagnetized to an extent corresponding to the peak current value of this half cycle while the other arm 50 or 49 is unaffected. This condition corresponds to flow of direct current through the conductor 27 in an amount equal to the peak current flow in the one half cycle just referred to. There is then a corresponding reduction in the length of the vector 62, FIG. 6, with the reduction being less than it otherwise would be if there were a corresponding demagnetization of the other arm 50 or 49 just referred to. The position of the rotatable permanent magnet 54 and the index 55 relative to the scale then indicates the maximum flow of direct current that has taken place in the conductor 27. This is the case whether this current flow is of a transient nature, as a direct current surge resulting from a lightning stroke, or is a continuous flow of direct current. Except for the calibration of the scale, the same maxmeter 46 can be employed for measuring maximum flow of both alternating and direct current in the conductor 27.

Various constructions can be employed for mounting the maxmeter 46 to facilitate its application to a current carrying conductor, such as the conductor 27. One mounting arrangement is shown in FIGS. 7–10, reference being had to FIGS. 4 and 5, to show holes 70—70 in the ends of the base portion 48 of the yoke 47. These holes 70—70 are provided for receiving screws 71—71 for mounting a self-energizing clamp, indicated generally at 72, which is employed for holding the maxmeter 47 in operative position on the conductor 27.

The self-energizing clamp 72 includes a bracket 73 of suitable non-magnetic material, such as brass, which overlies the base portion 48 of the yoke 47 and is held in position thereon by the screws 71—71. Near the ends of the bracket 73 and along one side thereof are bearing sections 74—74 for rotatably mounting shaft sections 75—75 of a clamp member that is indicated, generally, at 76 and is formed of suitable non-magnetic material such as brass wire. The clamp member 76 includes central operating arm sections 77—77 which extend radially from the shaft sections 75—75 and are joined by a connecting section 78 which is offset, as indicated at 79, from the main portions of the arm sections 77—77. One end 80 of a coil tension spring 81 is connected to the connecting section 78 while its other end 82 is connected or anchored to a tab 83 that is struck from the bracket 73. Because of the offset 79 the spring 81 acts as an overcenter spring and it functions to hold the clamp member 76 in either of the positions shown in FIGS. 7 and 9.

Extending radially from the other ends of the shaft sections 75—75 are clamp arms 84—84 on which gripping sleeves 85—85 of suitable insulating material having knurled surfaces are positioned.

When the maxmeter 46 is moved in the direction indicated by the arrow 85′ in FIG. 7 with the clamp member 76 in the position here shown, the continued movement in this direction causes the operating arm sections 77—77 to engage the conductor 27 and the continued movement permits the spring 81 to swing the clamp arms 84—84 to the position shown in FIG. 9 where the gripping sleeves 85—85 engage the upper side of the conductor 27 the lower side of which bears against the bottom of the U-shaped arms 49 and 50. The intermediate plate 58 includes a handle or support bracket 86, such as shown in FIG. 22 and described hereinafter, to facilitate attachment to and detachment from a conventional live line tool. After the maxmeter 46 has been positioned as shown in FIG. 9, the live line tool can be detached from the support bracket 86 and left to obtain a record of the maximum current flow through the conductor 27 that takes place during the period that it is mounted thereon.

It will be understood that the yoke 47 can be reversed from the position shown in FIGS. 7–10 for application to the conductor 27 from the opposite direction. Also it will be understood that the spring 81 is strong enough to hold the maxmeter 46 in position along the conductor 27 in the event that it extends vertically rather than horizontally. Such vertical positioning of the conductor 27 may be involved in connections to bus bars, transformers and the like where the conductors extend from underground cables and are located along vertical runs to suitable terminals located in vaults, switch houses, etc.

Attention is directed to the fact that it is not possible to injure the maxmeter 46 regardless of the magnitude of the current flow through the conductor 27. The only result of this current flow is to demagnetize the yoke 47 to a greater degree depending upon the magnitude of the current flow. When the yoke 47 is completely demagnetized, the position of the rotatable permanent magnet 54 is determined solely by the relationship between its magnetic field and the magnetic field of the stationary permanent magnet 52.

The conductor 27 may be energized at voltages ranging upwardly from 110 volts and it may form a part of an underground or an overhead electric distribution system. Such conductors are subject to the flow of transient current that may be caused by a lightning stroke, a switching surge or the like. In most instances such transient current flow, while relatively great in magnitude, is of such a short duration that little or no damage is caused thereby. However, it is desirable that means be provided for measuring accurately the maximum current flow in the conductor 27 without the measuring means being affected by the flow of transient current.

For this purpose the maxmeter, shown generally at 46, FIGS. 11–12, is employed. As will be apparent, means are provided for rendering the maxmeter 46 insensitive to the flow of transient current.

The maxmeter 46 includes the yoke, indicated generally at 47, which has a U-shape and is formed of low coercivity magnet steel. For example it may be formed of chrome or tungsten alloy steel. The yoke 47 has the base portion 48 and arms 49 and 50 extending therefrom each of which is of generally U-shape for the purpose of embracing the conductor 27.

The yoke 47 is arranged to be charged with unidirectional magnetic flux to saturation so as to have the polarities at the distal ends of the arms 49 and 50 as indicated by the C-shaped charging magnet 51 which has the polarities indicated. This is accomplished by placing the poles of the permanent magnet 51 along the inner surfaces of the arms 49 and 50 and sweeping it therealong from the base portion 48 to the distal ends. Thereafter the permanent magnet 51 is removed and the yoke is removed and the yoke 47 remains charged so that a magnetic field exists in and around the space between the distal ends of the arms 49 and 50.

As described, a stationary annular permanent magnet 52 of ceramic magnetic material is positioned between the distal ends of the arms 49 and 50. The stationary annular permanent magnet 52 is magnetized to have the polarities indicated and it is positioned with the magnetic axis inclined slightly to the perpendicular or line interconnecting the distal ends of the magnetized arms 49 and 50 of the yoke 47. If desired, a bar type of permanent magnet having the polarities indicated can be employed. The permanent magnet 52 has the central opening 53 to facilitate mounting of it between the distal ends of the arms 49 and 50.

Rotatably mounted coaxially with the permanent magnet 52 is the rotatable annular permanent magnet 54 of like character and having a pivot mounting that makes use of the central opening therethrough. The magnetic poles of the rotatable permanent magnet 54 are as indicated and it carries the index 55 that is movable relative to a scale (not shown) which provides an indication of the magnitude of current flow in the conductor 27. The rotatable annular permanent magnet 54 takes up a position which corresponds to the resultant of the magnetic fields of the yoke 47 and of the permanent magnet 52 as shown in FIG. 6 and described above. When the yoke 47 is fully charged, the rotatable permanent magnet 54 occupies a position in which its north pole is relatively close to the south pole on the distal end of the arm 50. On flow of alternating current through the conductor 27, the alternating magnetic field generated thereby acts to demagnetize the yoke 47. As a result the intensity of the unidirectional field reacting with the permanent magnet field of the rotatable magnet 54 becomes less, depending upon the extent that the yoke 47 is demagnetized. Accordingly, the rotatable permanent magnet 54 becomes more and more solely under the influence of the permanent magnet 52, as described above, and it rotates to this position which again is the resultant of the two stationary magnetic fields.

In order to render the yoke 47 relatively insensitive to flow of transient currents, time delay shading sleeves 87 and 88 are positioned around the arms 49 and 50 and adjacent their distal ends. These sleeves 87 and 88 are formed of good conducting metal such as copper or aluminum and serve to absorb the electromagnetic energy that is incident to the flow of transient current through the conductor 27. In effect the sleeves 87 and 88 are short circuited turns around the arms 49 and 50 and they are of such cross section as to absorb the energy incident to transient current flow and prevent it from demagnetizing the yoke 47 and otherwise causing an erroneous indication to be provided by the rotatable permanent magnet 54.

While the time delay shading sleeves 87 and 88 are effective in preventing demagnetization of the yoke 47 on flow of transient current, they are ineffective to prevent such demagnetization as the result of the flow of low frequency, i.e., 60-cycle per second, current or direct current in the conductor 27. Thus the application of the shading sleeves 87 and 88, while not affecting the accuracy of the maxmeter 46 for the measurement of flow of alternating or direct current in the conductor 27, are effective to prevent demagnetization of the yoke 47 on the flow of transient current in the conductor.

The provision of the time delay shading sleeves 87 and 88 for the purpose outlined is important in order that an erroneous position of the rotatable permanent magnet 54 will not result. It will be understood that the maxmeter 46 may be applied to a conductor 25 and left for a period of weeks or months. However, it is desirable that it indicate only the maximum flow of alternating or direct current that has taken place in the conductor 27 and that it not be affected by flow of transient current.

As pointed out, an important reason for employing the configuration shown for the yoke 47 is to cause one of the arms 49, for example, to be demagnetized to an extent depending upon the flow of current in one half cycle of the alternating current and then to have the other arm, i.e., the arm 50, demagnetized on the succeeding half cycle of the alternating current. Then, in the absence of the time delay shading sleeves 87 and 88, there would be no likelihood that a direct current surge of great magnitude, for example a surge resulting from a lightning stroke, would magnetize the yoke 47. The provision of the shading sleeves 87 and 88 prevents this as described above. Depending upon the direction of such direct current flow, one or the other of the arms 49 or 50 will be demagnetized to an extent depending upon the magnitude of the flow of direct current.

Since the arms 49 and 50 are demagnetized on successive half cycles of flow of maximum alternating current, it follows that, if only one half cycle of current flows, the corresponding arm 49 or 50 is demagnetized to an extent corresponding to the peak current value of this half cycle while the other arm 50 or 49 is unaffected. This condition corresponds to flow of direct current through the conductor 27 in an amount equal to the peak current flow in the one half cycle just referred to. There is then a corresponding reduction in the magnetic flux in one of the arms 49 or 50 with the reduction being less than it otherwise would be if there were a corresponding demagnetization of the other arm 50 or 49 just referred to. The position of the rotatable permanent magnet 54 and the index 55 relative to the scale (not shown) then indicates the maximum flow of direct current that has taken place in the conductor 27. This is the case when the direct current flow in the conductor 27 is a continuous flow in contradistinction to transient current flow which, because of the provision of the shading sleeves 87 and 88, has no effect on the demagnetization of the yoke 47.

Referring now particularly to FIG. 13 of the drawings, it will be observed that the reference character 27 designates a conductor in which the flow of current, either alternating or direct, normally is below a given value under ordinary operating conditions and rises above that value on the occurrence of a fault. Connected in the circuit is a fuse device which is arranged to blow on the occurrence of the overload or fault in conventional manner. One example of a fuse for this purpose is illustrated in U.S. Patent No. 2,809,254, issued Oct. 8, 1957, to W. D. Edsall. That patent shows a current limiting fuse connected in series with an overload type of fuse arranged so that on relatively low overloads only the overload type of fuse operates to interrupt the circuit. However, in the event that the overload is of relatively great magnitude, the current limiting section operates quickly to interrupt the circuit and may operate with sufficient speed so that the overload type of fuse does not operate. In other types of similar combinations the overcurrent type of fuse blows on low overloads as well as on high overloads when the current limiting fuse operates. Another type of current limiting fuse is shown in U.S. Patent No. 2,866,037, issued Dec. 23, 1958, to V. N. Stewart. Mention will be made specifically of the fuses of these two patents hereinafter. At the present it is pointed out that difficulty has been encountered in providing for indicating when fuses of these types have blown. One purpose of the present invention is to provide such indication.

As seen in FIG. 13 the maxmeter, indicated generally at 46, is associated with the conductor 27. It comprises the yoke 47 of generally U-shaped that is formed of relatively low coercivity magnetic steel such as a chrome, cobalt or tungsten alloy steel. The yoke 47 includes the base portion 48 and arms 49 and 50 extending therefrom which are of generally U-shape for embracing the conductor 27. In order to magnetize the yoke 47 to saturation the C-shaped permanent magnet 51 is employed and it has the polarities indicated. It is arranged to charge the yoke 47 to saturation and for this purpose it is first applied to the arms 49 and 50 adjacent the base portion 48 and then moved toward their distal ends so that, on detachment therefrom, they are polarized with the polarities indicated.

Mounted between the distal ends of the arms 49 and 50 is the stationary annular permanent magnet 52 that is magnetized along a diameter as indicated. It is provided with the central opening 53 to facilitate mounting and may be formed of ceramic magnetic material. The position of the permanent magnet 52 is important and attention is directed to the fact that its poles are positioned so that they are opposite unlike poles at the disal ends of the arms 49 and 50. The arrangement is such that the magnetic field from the stationary permanent magnet 52 acts in a direction nearly opposite the direction in which the magnetic field between the distal ends of the arms 49 and 50 acts. The reason for this will be apparent presently.

The rotatable annular permanent magnet 54, similar to the stationary annular permanent magnet 52, is rotatably mounted between the distal ends of the arms 49 and 50 in such position as to be subjected to the resultant magnetic field from the yoke 47 and the stationary permanent magnet 52. The rotatable permanent magnet 54 is polarized as indicated and it has a pivot mounting 89 that is mounted on suitable pivots as will be readily understood.

Since the rotatable annular permanent magnet 54 is intended to occupy either of two positions and not an intermediate position, it can be employed for indicating by its change in position whether the current flow in the conductor 27 has exceeded a predetermined value. Accordingly, the rotatable permanent magnet 54 is provided with an indicator section 90 that may be colored green and another indicator section 91 that may be colored red. It will be understood that, as long as the flow of current in the conductor 27 is below a predetermined value, the red indicator section 91 is concealed by a stationary mask 92 which has a sector 93 cut away to permit observation of the indicator sections 90 and 91. When the current flow in the conductor 27 exceeds the predetermined value, the reaction between the magnetic flux from the rotatable annular permanent magnet 54 and the resultant of the fluxes from the yoke 47 and the stationary permanent magnet 52 is such as to cause the rotatable permanent magnet 54 to rotate with a snap action to the alternate position. It will be understood that, instead of providing the indicator sections 90 and 91 directly on the rotatably permanent magnet 54, they may be placed on a separate disc that is connected to rotate with the permanent magnet 54.

FIG. 14 shows by a vector diagram the manner in which the maxmeter 46 operates to cause the rotatable permanent magnet 54 to shift with a snap action from one position to the other position. Here it will be observed that a vector 94 represents the magnitude of the flux from the low coercive force yoke 47 when it is magnetized to saturation. Vector 95 represents the direction and magnitude of the flux from the stationary permanent magnet 52. The flux represented by vector 95 is less than the flux represented by the vector 94 and its direction is opposite as above pointed out. For example the vector 95 acts in a direction as indicated by angle 96 of the order of 175° away from the direction in which the vector 94 extends. The resultant of these fluxes is indicated by vector 97 and the rotatable permanent magnet 54 takes up a position with the axis of its diametrically opposite poles located along the vector 97. With this arrangement of the fluxes represented by the vectors 94 and 95, even though there is some reduction in the magnitude of the flux from the yoke 47 represented by the vector 94 caused by normal current flow in the conductor 27, it is insufficient to change appreciably the position of the vector 97. Accordingly, as long as the current flow in the conductor 27 is below a predetermined value, the vector 97 remains substantially in the position shown and the indicator section 90 remains visible through the cutaway sector 93 of the mask 92.

Now it will be assumed that the current flow in the conductor 27 is such as to exceed the predetermined value. For example, if it is assumed that the normal current flow in the conductor 27 is of the order of 200 amperes, then if a 200-ampere fuse is provided in it, it will not blow under ordinary conditions unless the current flow in the conductor exceds 400 amperes. Ordinarily, if the current flow increases to the extent indicated, it will increase to a substantially greater value as the result of the occurrence of a fault. Thus the current flow may be of the order of several thousands of amperes. When this takes place, there is a corresponding reduction in the unidirectional flux from the yoke 47 since it is demagnetized and the vector 94 is correspondingly shortened. For example, it may be shortened to a relatively small value as indicated by vector 98. The resultant of the flux represented by the vector 98 and the flux represented by the vector 95 now is represented by vector 99, as shown by a broken line. It will be apparent that the resultant has shifted from the position represented by vector 97 to the position represented by vector 99 through an angle that is indicated at 100. Since the position of the rotatable permanent magnet 54 is controlled by the position of the resultant of the fluxes from the yoke 47 and from the stationary permanent magnet 52, the rotatable permanent magnet 54 will rotate or shift with a snap action to a position in alignment with the vector 99. Here the red indicator section 91 is visible while the green indicator section 90 is concealed by the mask 92. The rotatable permanent magnet 54 in the alternate position carries the indication that the current flow in the conductor 27 has exceeded a predetermined value and this indication remains regardless of what current flow subsequently takes place in the conductor 27 until the yoke 47 is again magnetized by the charging magnet 51 or by another like source of unidirectional magnetic flux. Preferably this is accomplished by removing the maxmeter 46 from the conductor 27 and applying the charging magnet 51 in the manner described. The time delay shading sleeves of copper or aluminum are provided as indicated at 87 and 88 on the arms 49 and 50 of the yoke 47 for the purpose of rendering the maxmeter 46 insensitive to the flow of transient current in the conductor 27 as previously described.

In FIG. 14 the position of the vector 95 with reference to the vector 93 has been shown to be somewhat less than the angle of 175° mentioned as the actual relationship. Corresponding changes have been made in the positions of the other vectors. The reason for this is that, if the vector 95 were shown substantially opposite the vector 94, it would not be feasible to represent in the vector diagram the relationship between the several vectors and their resultants.

As pointed out above, an important reason for employing the configuration shown for the yoke 47 is to cause one of the arms, 49 for example, to be demagnetized to an extent depending upon the flow of current in the conductor 27 which may be either alternating current or direct current. If the flow is of alternating current, then the arm 49 may be demagnetized upon flow of current in one half cycle while the other arm 50 is demagnetized on flow of the succeeding half cycle of the alternating current. In the event that direct current flows in the conductor 27, then one or the other of the arms 49 or 50 will be demagnetized depending upon the magnitude of the flow of such direct current. Thus, when alternating current flows in the conductor 27, both arms 49 and 50 are demagnetized on flow of successive half cycles of the alternating current while, when direct current flows in the conductor 27, either one or the other of the arms 49 or 50 is demagnetized, depending upon the direction of current flow with the net remnant magnetism in both arms being less than that due to the magnetism in the arm that was not demagnetized due to the flow of direct current because of the configuration of the yoke 47 and resultant distribution of the magnetic flux.

Considering the operation of the maxmeter 46 on flow of direct current in the conductor 27, it will be apparent that, on flow of such current below a predetermined value, the demagnetizing action on one or the other of the arms 49 or 50 will not be sufficient to reduce materially the flux indicated by the vector 94 in FIG. 14. When the flow of direct current is of sufficient magnitude, the flux in one or the other of the arms 49 or 50 will be reduced as described above and there will be a corresponding reduction in the length of the vector 94 with the result that, on reduction to a predetermined amount less than that represented by vector 95, the rotatable permanent magnet 54 will shift from the position corresponding to the position of the vector 97 to the operated position corresponding to that of the vector 99. It will be understood that, while the vector diagram in FIG. 14, illustrates the principle of operation of the present invention, the relative values of the fluxes represented by the vectors will be changed for flow of direct current in the conductor 27 as compared to their values for alternating current.

If the stationary ceramic magnet 52 is positioned as shown in FIGS. 5 and 11 instead of being positioned as shown in FIG. 13, then the position of the vector 95 shifts to the position for the corresponding vector as shown in FIG. 6. With such a modification, the position of the rotatable ceramic magnet 54 shifts in accordance with the magnitude of the maximum flow of alternating current or direct current in the conductor 27. The principal difference in the indication results from the requirement of a different calibration for the position of the rotatable ceramic magnet 54 for indicating maximum flow of alternating current in the conductor 27 as compared to the indication for the maximum flow of direct current in the conductor 27. The difference is due to the fact that in the one case both arms 49 and 50 are demagnetized while in the other case only one of these arms is demagnetized with the remnant magnetism being as above outlined.

FIGS. 15, 16 and 17 show a construction that is similar to the construction illustrated in FIG. 13 except that the stationary annular permanent magnet 52 is omitted. The biasing action otherwise provided by this stationary magnet is provided by a weight 101 which is located in an uppermost position when the yoke 47 is charged to saturation with unidirectional magnetic flux. Upon demagnetization of the yoke 47 in the manner described, the weight 101 biases the rotatable permanent magnet 54 to the alternate position where the red indicator 91 is visible and the green indicator section 90 is concealed by the mask 92. When the construction shown in these figures is employed, it is necessary that the maxmeter 46 be associated with a vertically extending conductor and that the weight 101 be uppermost.

The construction shown in FIGS. 15, 16 and 17 can be made independent of the force of gravity through the provision of a torsion spring 102, FIG. 18. The spring 102 is arranged to bias the rotatable permanent magnet 54 to the operated position where the red indicator section 91 is visible. The reaction between the permanent magnet field from the rotatable permanent magnet 54 and the field from the yoke 47 is such as to hold the rotatable permanent magnet 54 in the non-operated position until the yoke 47 is demagnetized in the manner described. When this occurs, the biasing spring 102, which reacts between a stationary pivot or shaft 103 for the rotatable permanent magnet 54 and the latter, urges it to the position where the red indicator section 91 is visible.

Referring now particularly to FIG. 19 of the drawings, it will be noted that the conductor 27 has connected therein a current limiting fuse that is indicated, generally, at 104. The current limiting fuse 104 can be constructed as shown in U.S. Patent No. 2,866,037, issued Dec. 23, 1958, to V. N. Stewart. As shown here the maxmeter 46 can be applied to the current limiting fuse 104 intermediate its ends. On flow of current in the conductor 27 sufficient to cause the curent limiting fuse 104 to blow, the maxmeter 46 operates in the manner described to cause the red indicator section 91 to be visible thereby indicating that the current limiting fuse 104 has blown. The size of the shading sleeves 87 and 88 can be modified to accommodate the time-current characteristic of the current limiting fuse 104. If maximum speed of response is required, the shading sleeves 87 and 88 can be entirely omitted. The stationary permanent magnet 52 is mounted on the rear side of the intermediate plate 58 previously described and the movable permanent magnet 54 is rotatably mounted between the plate 58 and transparent cover plate 59 in an opening 105 in the former. The screws 60 hold the assembly in position on the distal ends of the arms 49 and 50.

It may be objectionable to position the maxmeter 46 on the current limiting fuse 104 and between its end terminals. When so positioned it reduces the insulation between these terminals after the fuse has blown. Accordingly, instead of positioning it as shown in FIG. 19, the maxmeter 46 can be positioned in embracing relation with respect to the conductor 27 at either end of the current limiting fuse 104.

FIG. 20 illustrates the composite fusible protective device shown in U.S. Patent No. 2,809,254, issued Oct. 8, 1957, to W. S. Edsall. It will be noted in FIG. 20 that this construction includes a low overload fuse, indicated generally at 106, and a current limiting fuse, indicated generally at 107. They are positioned, as described in the patent, within a transparent plastic enclosure 108 and they are connected in a circuit that can be represented by the conductor 27. Insulating tape 109 overlies the upper and lower ends of the plastic enclosure 108 and extends along the sections of the conductor 27 in the manner shown.

Instead of employing the conventional indicators described in the Edsall patent, which are destroyed and must be replaced after each operation, maxmeters 46 and 46' can be employed as blown fuse indicators. Since the low overload fuse 106 is arranged to operate at a substantially lower value of current than is the current limiting fuse 107, the maxmeter 46 associated therewith is arranged and constructed so that the red indicator section 91 will appear on flow of current in the conductor 27 sufficient to cause operation of the low overload fuse 106 but insufficient to cause blowing of the current limiting fuse 107. Likewise, the maxmeter 46', employed as a blown fuse indicator for the current limiting fuse 107, is arranged and adapted to display the red indicator section 91 only in the event of flow of fault current sufficient to cause operation of the current limiting fuse 107 which is substantially higher than that required to cause operation of the low overload fuse 106. If only the red indicator section 91 for the maxmeter 46 is visible, it will be apparent that only the low overload fuse 106 has operated. If both maxmeters 46 and 46' have their red indicator sections 91 showing, it will indicate that the current limiting fuse 107 has operated and that sufficient current has flowed through the low overload fuse 106 for a sufficient time to cause it to operate. It may or may not operate, depending upon the character of the overload as described in the Edsall patent.

In order to prevent operation of the maxmeter 46 when the current flow in the conductor 27 is of a transient nature or is of a magnitude and for a relatively short time sufficient to blow the current limiting fuse 107, the maxmeter 46 has the yoke 47 formed preferably of 3% chrome magnet steel and carries the time delay shading sleeves 87 and 88 thereon. If the fault current condition is such that the current flow is of a transient nature only, for example as the result of a lightning surge, or is of such a short time duration that the shading sleeves 87 and 88 are capable of absorbing the energy incident to such current flow, then the arms 49 and/or 50 will not be demagnetized and the maxmeter 46 will not operate.

In order to arrange for the maxmeter 46', associated with the current limiting fuse 107, to be selective with respect to the operation of the maxmeter 46 associated with the low overload fuse 106, the yoke 47 for the maxmeter 46' is formed of 17% cobalt magnet steel where it is desired that the effect of the flow, for example of 750 amperes alternating current in the conductor 27 or the equivalent flow of direct current therein, will cause the maxmeter 46' to operate. In addition, the time delay shading sleeves 87' and 88' are reduced in size. They may be reduced in current carrying capacity to half the size of the shading sleeves 87 and 88 associated with the maxmeter 46 or they may be omitted altogether. Thus, there are two important differences between the maxmeters 46 and 46'. The maxmeter 46 is intended to operate on flow of relatively small current in the conductor 27, i.e., on flow of from 375 to 400 amperes alternating current or the equivalent direct current. The maxmeter 46 is not intended to operate on flow of substantially higher current, provided the duration of such current flow is of the order of the time required for transient current to flow as the result of a lightning surge or the time required for the current to flow sufficient to cause operation of the current limiting fuse 107. The maxmeter 46' differs from the maxmeter 46 in that it will not be operated unless the flow of alternating current is of the order of 750 to 800 amperes or the equivalent direct current flow in the conductor 27. The shading sleeves 87' and 88' are reduced in size from the size of the shading sleeves 85 and 88 or are omitted altogether so that the maxmeter 46' is operated only as the result of flow of fault current of the magnitude above indicated and for a relatively short time as compared to the time required for effecting the operation of the maxmeter 46.

If the maxmeter 46' is intended to operate in a range of the order of 3,000 amperes, then the yoke 47 preferably is formed of 36% cobalt magnet steel.

Instead of positioning the maxmeters 46 and 46' within the plastic enclosure 108, they may be positioned exteriorly thereto as shown by broken lines since their operation depends upon the magnitude and duration of fault current flow in the conductor 27 and is not dependent upon where they are located with respect to the fuses 106 and 107.

FIG. 21 shows how the maxmeter 46, constructed as described herein, can be employed for controlling the operation of a circuit breaker 110. It will be noted that the circuit breaker 110 includes contacts 111 that are connected in conventional manner in the conductor 27 and that a bridging member 112 is provided for controlling the connection therebetween. A spring 113 is shown to illustrate that the bridging member 112 normally is biased to the open circuit position. It is held against the biasing action of the spring 113 by a detent 114 which reacts against a latch 115 the position of which is controlled by an armature 116. For moving the armature 116 a trip coil 117 is employed that can be energized from a suitable source, such as a battery 118, on closure of normally open contacts 119 by a bridging member 120. The bridging member 120 is arranged to be engaged by an operating pin 121 that extends radially from the rotatable annular permanent magnet 54. With the maxmeter 46 positioned as shown in FIG. 21 relative to the conductor 27, upon the occurrence of a predetermined current flow therein, the rotatable permanent magnet 54 is shifted with a snap action in the manner described to the alternate position where the operating pin 121 actuates the bridging member 120 to complete the energizing circuit at the contact 119 for the trip coil 117. The latch 115 is withdrawn and the bridging member 112 is operated to the open circuit position by the spring 113.

FIGS. 22–26 show the details of construction of a commercial form of the maxmeter 46. Here the yoke 47 and self energizing clamp 72 are employed as previously described. The sleeves 85 have smooth instead of roughened outer surfaces. The yoke 47 is mounted on a support or handle 122 that is formed of molded plastic insulating material such as methylmethacrylate resin. The yoke 47 is mounted at one end of the support or handle 122 while the other end is provided with an eye 123 for receiving the prong of a live line tool. Additionally slots 124 are provided in the sides to receive another type of manipulating device.

FIG. 23 shows a shallow annular cavity 125 that is formed in the rear side of the support or handle 122 from the central portion of which a boss 126 extends. The stationary permanent magnet 52 is properly positioned within the cavity 125 around the boss 126 and is secured thereto by a suitable adhesive. The bottom of the cavity 125 is formed by a thin section 127 which also forms the bottom of a relatively deep cavity 128 in the front side which has a stepped portion 128'. Counterbored openings 129, FIG. 24, are formed at the sides of the support or handle 122 through which mounting screws 130 extend into the distal ends of the arms 49 and 50 of the yoke 47.

The rotatable permanent magnet 54 is secured to a central portion of a hub 131 that is formed of a suitable plastic insulating material such as "Delrin." Ample clearance is provided between the periphery of the rotatable permanent magnet 54 and the inner surface of the cavity 128. Rotatable with the permanent magnet 54 on the hub 131 is a disc 132 that preferably is formed of aluminum. As shown in FIG. 25 the disc 132 carries a semi circular white flag 133 and a similarly shaped red flag 134. The flags 133 and 134 are formed of reflecting adhesive tape and are applied to the front side of the disc 132. The disc 132 carrying the flags 133 and 134 is positioned between the permanent magnet 54 on the hub 131 and a flange 135 that is formed integrally with the hub 131. A friction washer 136 secures the assembly together so that the magnet 54 and disc 132 rotate conjointly with the hub 131.

The hub 131 is mounted on one end on a pivot 137 that is molded integrally with the thin section 127 of the support or handle 122. The other end of the hub 131 is rotatably mounted on a pivot 138 that is molded integrally with a cover 139 that preferably is formed of transparent methylmethacrylate resin. One or the other of the integral pivots 137 or 138 can be omitted and instead a threaded pivot can be substituted therefor as described hereinafter.

The cover 139 is held in position on the support or handle 122 by self tapping screws 140 the heads of which are positioned in the enlarged portions of counterbored openings 141, FIG. 24, in the cover 139. The screws 140 are threaded into suitable openings 142 that are molded into the support or handle 122.

Since it is desirable that only one or the other of the flags 133 or 134 be visible, a mask 143 is interposed between the support or handle 122 and the cover 139. The mask 143 has an opening 144 through which only a central portion of one or the other of the flags 133 or 134 can be viewed, depending upon the position of the disc 132 and the previous history of demagnetization of the yoke 47 in the manner previously described.

The construction shown in FIGS. 22–26 is employed where it is desired that there be provided an indication that fault current has flowed in the conductor 27. For this application the poles of the stationary permanent magnet 52 are arranged as shown in FIG. 13 so that they are substantially in alignment with and opposing the poles at the distal ends of the arms 49 and 50. Where an indication of the actual amount of current that has flowed in the conductor 27 is desired, the stationary permanent magnet 52 is positioned between the distal ends of the arms 49 and 50 as shown in FIGS. 5 and 11 and a pointer is provided, such as the pointer 34, for movement relative to a scale, such as the scale 35 shown in FIG. 3.

FIG. 27 shows an alternate mounting for the hub 131. Here threaded pivots 145 of suitable material, such as stainless steel, are positioned in threaded openings in the boss 126 and in the cover 139. It will be understood that only one of the threaded pivots 145 can be employed while the other pivot can be formed integrally with either the thin section 127 or the cover 139 as the case may be. An important reason for using the two threaded pivots 145 is to provide for some axial adjustment of the hub 131 and thereby of the rotatable permanent magnet 54 with respect to the stationary permanent magnet 52 for calibrating purposes. Where only a single threaded pivot 145 is employed, it makes it possible to readily adjust the clearance at the ends of the hub 131 with respect to the pivot surfaces. In that case, no adjustment can be obtained axially. However, by modifying the degree of magnetization of the stationary permanent magnet 52 or of the rotatable permanent magnet 54 or both, it is possible to calibrate the device.

What is claimed as new is:

1. Means for measuring the maximum flow of alternating current in a conductor comprising, in combination: a generally U-shaped magnetic member having relatively low coercivity and its arms individually of U-shape for embracing said conductor, magnetized with unidirectional flux to have opposite poles induced in the ends of the arms, and positionable with both arms on the same side of and adjacent said conductor and in the alternating magnetic field generated by said maximum alternating current flow whereby the unidirectional magnetic flux in one arm is reduced on one half cycle of the alternating current and the unidirectional magnetic flux in the other arm is reduced on the next half cycle of the alternating current both as functions of the magnitudes of said half cycles of alternating current; and means for measuring the magnitude of the remaining unidirectional magnetic flux between said ends of said arms of said U-shaped magnetic member.

2. The invention, as set forth in claim 1, wherein permanent magnet means stationarily mounted with respect to the distal ends of the arms of the U-shaped magnetic member provides a unidirectional magnetic field angularly related to the unidirectional magnetic field between said distal ends of said arms, and the measuring means is responsive to the resultant of said unidirectional magnetic fields.

3. The invention, as set forth in claim 2, wherein the measuring means includes permanent magnet means rotatably mounted to be responsive to the resultant of the unidirectional magnetic fields and assumes an angular position corresponding to the magnitude of said resultant.

4. The invention, as set forth in claim 3, wherein conductor clamp means is mounted on the portion of the U-shaped magnetic member common to its arms and is operable to clamping position on application of said U-shaped magnetic member to the conductor and to an unclamping position on removal therefrom.

5. The invention, as set forth in claim 3, wherein stationary damping ring means is mounted adjacent the rotatable permanent magnet means to limit the oscillatory movement thereof.

6. Means for measuring current flow in a conductor comprising: a non-magnetic support member; a generally U-shaped magnetic member having relatively low coercivity with the arms individually of U-shape for embracing said conductor, magnetized with unidirectional flux to have opposite poles induced in the ends of said arms, and mounted on said support member; permanent magnet means stationarily mounted on said support member between said ends of said arms and providing with the magnetic field therebetween a resultant magnetic field the magnitude and direction of which are a function of the maximum current flow in said conductor; and means rotatably mounted on said support member, responsive to said resultant magnetic field and taking a position corresponding to the position thereof.

7. The invention, as set forth in claim 6, wherein the support member includes a support bracket having means for attachment to and detachment from a live line stick for manipulating the current measuring means with respect to a high voltage conductor.

8. The invention, as set forth in claim 6, wherein self energizing conductor clamp means is mounted on the base of the U-shaped magnetic member for holding the current measuring means in operative position on the conductor.

9. The invention, as set forth in claim 8, wherein the self energizing clamp means includes an operating arm section rotatable between the arms of the U-shaped magnetic member, clamp arms rotatable along opposite sides of said arms of said U-shaped magnetic member for engaging the conductor, and spring means interconnecting said U-shaped magnetic member and said operating arm for holding said clamp arms in clamping engagement with said conductor.

10. The invention, as set forth in claim 6, wherein the rotatably mounted means includes a permanent magnet and index means to show the position of the resultant magnetic field.

11. The invention, as set forth in claim 10, wherein the index means is a pointer for cooperation with a scale carried by the support member.

12. Means for measuring the flow of current in a conductor comprising: a generally U-shaped magnetic member having relatively low coercivity and its arms individually of U-shape for embracing said conductor, magnetized with unidirectional flux and positionable with both arms on the same side of said conductor and in the magnetic field generated by said current, means for measuring the magnitude of said unidirectional flux, and conducting means overlying at least one of said arms for limiting the reduction in said unidirectional flux resulting from transient current flow through said conductor.

13. The invention, as set forth in claim 12, wherein both arms are provided with conducting means.

14. The invention, as set forth in claim 13 wherein the conducting means is a sleeve of good conducting metal telescoped with each arm.

15. Means for measuring the flow of alternating current in a conductor comprising: a generally U-shaped magnetic member having relatively low coercivity and its arms individually of U-shape for embracing said conductor, magnetized with unidirectional flux and positionable with both arms on the same side of said conductor and in the alternating magnetic field generated by said alternating current means for measuring the magnitude of said unidirectional flux, and conducting means overlying at least one of said arms for limiting the reduction in said unidirectional flux resulting from transient current flow through said conductor.

16. Means responsive to flow of current in a conductor comprising: a U-shaped magnetic member having relatively low coercivity and its arms individually of U-shape for embracing said conductor, magnetized with unidirectional magnetic flux and positionable in the magnetic field generated by flow of current in the conductor whereby said unidirectional flux is reduced as a function of the magnitude of said flow of current, a movable permanent magnet positioned in the unidirectional field of said magnetic member and occupying a position with its poles adjacent unlike poles of said magnetic member, and means biasing said movable permanent magnet to an alternate position to which it moves on demagnetization of said magnetic member by flow of current sufficient to permit said biasing means to operate as aforesaid.

17. The invention, as set forth in claim 16, wherein the biasing means is a stationary permanent magnet in the field of the magnetic member with its poles adjacent unlike poles of said magnetic member.

18. Means responsive to flow of current in a conductor comprising: a U-shaped magnetic member having relatively low coercivity and its arms individually of U-shape for embracing said conductor, magnetized with unidirectional magnetic flux and positionable in the magnetic field generated by flow of current in the conductor whereby said unidirectional flux is reduced as a function of the magnitude of said flow of current, a stationary permanent magnet in the field of said magnetic member having its poles adjacent like poles thereof with the unidirectional field of said permanent magnet less than that of said magnetic member, and a rotatable permanent magnet positioned to be responsive to the resultant unidirectional field from said magnetic member and said stationary permanent magnet.

19. The invention, as set forth in claim 18, wherein: The magnetic field generated by flow of current through the conductor below a predetermined magnitude being insufficient to demagnetize appreciably said magnetic member, and the magnetic field generated by flow of current through the conductor above said predetermined magnitude being sufficient to demagnetize said magnetic member such that the unidirectional magnetic field therefrom is substantially less than that of the stationary permanent magnet whereupon the rotatable permanent magnet rotates to an alternate position corresponding to the new position of the resultant undirectional field.

20. Means for measuring current flow in a conductor comprising: non-magnetic support means; a generally U-shaped magnetic member having relatively low coercivity with the arms individually of U-shape for embracing said conductor, magnetized with unidirectional flux to have opposite poles induced in the ends of said arms, and mounted on said support means; permanent magnet means stationarily mounted on said support means between said ends of said arms and providing with the magnetic field therebetween a resultant magnetic field the magnitude and direction of which are a function of the maximum current flow in said conductor; oppositely spaced pivot means on said support means, a hub journaled between said pivot means, permanent magnet means secured to said hub and taking a position corresponding to the resultant of the magnetic fields from said arms of said U-shaped magnetic member and said stationary permanent magnet means, and index means secured to said hub to indicate the position thereof.

21. The invention, as set forth in claim 20, wherein at least one of said pivot means is formed integrally with said non-magnetic support means.

22. The invention, as set forth in claim 20, wherein at least one of said pivot means is threaded into said non-magnetic support means for adjustment relative to the other pivot means.

23. The invention, as set forth in claim 20, wherein said non-magnetic support means includes a cover plate carrying one of said pivot means, screw means underneath said cover secure said support means to the distal ends of said arms, and additional screw means secure said cover plate in position.

24. The invention, as set forth in claim 20, wherein said non-magnetic support means includes a cover plate carrying one of said pivot means, and a mask is positioned underneath said cover plate and has an opening for viewing said index means.

References Cited

UNITED STATES PATENTS

| | | | |
|---|---|---|---|
| 1,450,670 | 4/1923 | La Mar | 200—121 |
| 1,942,052 | 1/1934 | Foust et al. | 324—103 |
| 2,018,459 | 10/1935 | Menger | 340—253 |
| 2,308,756 | 1/1943 | Wey | 324—152 |
| 2,382,295 | 8/1945 | Conrad | 324—140 |
| 2,498,261 | 2/1950 | Fritzinger | 324—146 XR |
| 2,585,974 | 2/1952 | Taylor et al. | 324—34 |
| 2,519,071 | 8/1950 | Rowell | 324—127 |
| 2,915,683 | 12/1959 | Lewus | 335—245 |
| 2,921,238 | 1/1960 | Wollerton | 317—60 X |

RUDOLPH V. ROLINEC, *Primary Examiner.*

A. E. SMITH, *Assistant Examiner.*

U.S. Cl. X.R.

324—103, 129, 151; 340—253